United States Patent [19]

Silva et al.

[11] Patent Number: 4,743,676
[45] Date of Patent: May 10, 1988

[54] METHOD FOR PREPARING POLYCARBONATE OF CONTROLLED MOLECULAR WEIGHT FROM AROMATIC BISCHLOROFORMATE

[75] Inventors: James M. Silva, Clifton Park, N.Y.; Robert A. Pyles, Evansville, Ind.

[73] Assignee: General Electric Company, Schenectady, N.Y.

[21] Appl. No.: 46,768

[22] Filed: May 7, 1987

[51] Int. Cl.[4] ............................................. C08G 63/62
[52] U.S. Cl. .................................... 528/371; 528/370; 528/372
[58] Field of Search ........................ 528/371, 372, 370

[56] References Cited

U.S. PATENT DOCUMENTS 3,046,255  7/1962  Strain et al. ........................ 528/371

Primary Examiner—Harold D. Anderson
Attorney, Agent, or Firm—William H. Pittman; James C. Davis, Jr.; James Magee, Jr.

[57] ABSTRACT

Linear polycarbonates of controlled molecular weight are prepared by first reacting a bischloroformate composition with a monohydroxyaromatic compound in a system comprising water, a base and a suitable organic liquid, and then converting the resulting partially capped bischloroformate composition to linear polycarbonate by contact with an interfacial polycarbonate formation catalyst in an alkaline medium. By this method, the efficiency of the capping agent is improved.

20 Claims, No Drawings

METHOD FOR PREPARING POLYCARBONATE OF CONTROLLED MOLECULAR WEIGHT FROM AROMATIC BISCHLOROFORMATE

This invention relates to the preparation of linear polycarbonates from bischloroformate compositions. More particularly, it relates to the preparation of linear polycarbonates of controlled molecular weight.

The preparation of bischloroformate compositions and their conversion to linear polycarbonates is known. Reference is made, for example, to U.S. Pat. Nos. 3,646,102, 4,089,888 and 4,122,112, and also to copending, commonly owned application Ser. No. 917,751, filed Oct. 10, 1986.

In many procedures for the preparation of linear polycarbonates, both from bischloroformate compositions and by the reaction of phosgene with bisphenols, a monohydroxyaromatic compound is frequently used as an agent for molecular weight control. Said monohydroxyaromatic compound (hereinafter sometimes simply designated "phenol" for brevity), when incorporated in minor proportions in the reaction mixture, reacts with chloroformate-terminated polymers to form inert aromatic end groups, incapable of further polymerization.

Among the molecular species capable of so reacting with phenols are chloroformate species of very low molecular weight. Phosgene itself may also react when it is used in the synthesis of the polycarbonate, yielding a diaryl carbonate such as diphenyl carbonate.

It has been found that the presence in the product of diaryl carbonates, as well as the presence of low molecular weight polycarbonate oligomers, may cause difficulties in molding operations. These include problems in removing molded polycarbonate articles from the mold, in producing parts using rapid cycle times, and in producing parts without physically or optically flawed surfaces. Such problems can be particularly vexatious when regularity of shape of such molded articles is a prime concern, such as in the molding of optical disks.

It has also been discovered that conventional methods for preparing linear polycarbonates from phosgene or bischloroformate compositions are relatively inefficient in their utilization of phenols introduced for molecular weight control. The average molecular weight of the polycarbonate is frequently higher than would be expected, considering the amount of phenol present. The reasons for this phenomenon are not fully understood, but it is possible that the phenol does not completely react or that it reacts preferentially with very low molecular weight species, producing oligomers which do not materially contribute to the weight average molecular weight of the polycarbonate product.

The present invention provides a method for linear polycarbonate preparation with improved incorporation of phenols used for molecular weight control. As a result of this improved incorporation, a lower proportion of phenol is necessary for the production of a polycarbonate with a given average molecular weight. The invention also produces polycarbonate products containing no detectable diaryl carbonate and having the potential for insignificant or very low proportions of low molecular weight oligomers, thus minimizing molding problems of the type previously described.

The invention is a method for preparing a linear aromatic polycarbonate of controlled molecular weight which comprises the steps of:

(A) reacting an aromatic bischloroformate composition with a monohydroxyaromatic compound or salt thereof in a reaction system also comprising water, a substantially inert, substantially water-insoluble organic liquid and an alkali or alkaline earth metal base, to produce a partially capped bischloroformate composition; and (B) contacting said partially capped bischloroformate composition with an interfacial polycarbonate formation catalyst and an aqueous alkali metal or alkaline earth metal base to form said linear aromatic polycarbonate.

The aromatic bischloroformate compositions utilized in the method of this invention comprise compounds having the formula

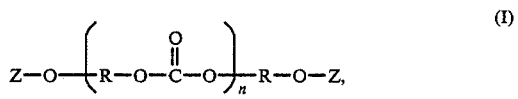

wherein R is a divalent aromatic radical; each Z is independently H or

at least one Z being

and n is 0 or a positive number. They usually comprise principally bischloroformates (i.e., each Z is

having varying molecular weight. It is often desirable to maximize the proportion of bischloroformates in which n is from 0 to about 6, at the expense of higher bischloroformates, monochloroformates, unreacted dihydroxyaromatic compounds and other by-products. It is also necessary that the bischloroformate composition be essentially phosgene-free; if phosgene is present, it will react with the phenol to form diaryl carbonate, whose presence is disadvantageous as noted hereinabove.

These bischloroformate compositions may be prepared by known methods by the reaction of phosgene with dihydroxyaromatic compounds having the formula

The R values may be aromatic hydrocarbon or substituted aromatic hydrocarbon radicals, with illustrative substituents being alkyl, cycloalkyl, alkenyl (e.g., crosslinkable-graftable moieties such as allyl), halo (especially fluoro, chloro and/or bromo), nitro and alkoxy.

The preferred R values have the formula

wherein each of $A^1$ and $A^2$ is a monocyclic divalent aromatic radical and Y is a bridging radical in which one or two atoms separate $A^1$ from $A^2$. The free valence bonds in formula III are usually in the meta or para positions of $A^1$ and $A^2$ in relation to Y.

In formula III, the $A^1$ and $A^2$ values may be unsubstituted phenylene or substituted derivatives thereof wherein the substituents are as defined for R. Unsubstituted phenylene radicals are preferred. Both $A^1$ and $A^2$ are preferably p-phenylene, although both may be o- or m-phenylene or one o- or m-phenylene and the other p-phenylene.

The bridging radical, Y, is one in which one or two atoms, preferably one, separate $A^1$ from $A^2$. It is most often a hydrocarbon radical and particularly a saturated $C_{1-12}$ aliphatic or alicyclic radical such as methylene, cyclohexylmethylene, [2.2.1]bicycloheptylmethylene, ethylene, ethylidene, 2,2-propylidene, 1,1-(2,2-dimethylpropylidene), cyclohexylidene, cyclopentadecylidene, cyclododecylidene or 2,2-adamantylidene, especially an alkylidene radical. Aryl-substituted radicals are included, as are unsaturated radicals and radicals containing atoms other than carbon and hydrogen; e.g., oxy groups. Substituents such as those previously enumerated may be present on the aliphatic, alicyclic and aromatic portions of the Y group.

The following dihydroxyaromatic compounds are illustrative:
Resorcinol
4-Bromoresorcinol
Hydroquinone
4,4'-Dihydroxybiphenyl
1,6-Dihydroxynaphthalene
2,6-Dihydroxynaphthalene
Bis(4-hydroxyphenyl)methane
Bis(4-hydroxyphenyl)diphenylmethane
Bis(4-hydroxyphenyl)-1-naphthylmethane
1,1-Bis(4-hydroxyphenyl)ethane
1,2-Bis(4-hydroxyphenyl)ethane
1,1-Bis(4-hydroxyphenyl)-1-phenylethane
2,2-Bis(4-hydroxyphenyl)propane ("bisphenol A")
2-(4-Hydroxyphenyl)-2-)3-hydroxyphenyl)propane
2,2-Bis(4-hydroxyphenyl)butane
1,1-Bis(4-hydroxyphenyl)isobutane
1,1-Bis(4-hydroxyphenyl)cyclohexane
1,1-Bis(4-hydroxyphenyl)cyclododecane
Trans-2,3-bis(4-hydroxyphenyl)-2-butene
2,2-Bis(4-hydroxyphenyl)adamantane
αα'-Bis(4-hydroxyphenyl)toluene
Bis(4-hydroxyphenyl)acetonitrile
2,2-Bis(3-methyl-4-hydroxyphenyl)propane
2,2-Bis(3-ethyl-4-hydroxyphenyl)propane
2,2-Bis(3-n-propyl-4-hydroxyphenyl)propane
2,2-Bis(3-isopropyl-4-hydroxyphenyl)propane
2,2-Bis(3-sec-butyl-4-hydroxyphenyl)propane
2,2-Bis(3-t-butyl-4-hydroxyphenyl)propane
2,2-Bis(3-cyclohexyl-4-hydroxyphenyl)propane
2,2-Bis(3-allyl-4-hydroxyphenyl)propane
2,2-Bis(3-methoxy-4-hydroxyphenyl)propane
2,2-Bis(3,5-dimethyl-4-hydroxyphenyl)propane
2,2-Bis(2,3,5,6-tetramethyl-4-hydroxyphenyl)propane
2,2-Bis(3-5-dichloro-4-hydroxyphenyl)propane
2,2-Bis(3,5-dibromo-4-hydroxyphenyl)propane
2,2-Bis(2,6-dibromo-3,5-dimethyl-4-hydroxyphenyl)propane
α,α-Bis(4-hydroxyphenyl)toluene
α,α,α',α'-Tetramethyl-α,α'-bis(4-hydroxyphenyl)-p-xylene
2,2-Bis(4-hydroxyphenyl)hexafluoropropane
1,1-Dichloro-2,2-bis(4-hydroxyphenyl)ethylene
1,1-Dibromo-2,2-bis(4-hydroxyphenyl)ethylene
1,1-Dichloro-2,2-bis(5-phenoxy-4-hydroxyphenyl)ethylene
4,4'-Dihydroxybenzophenone
3,3-Bis(4-hydroxyphenyl)-2-butanone
1,6-Bis(4-hydroxyphenyl)-1,6-hexanedione
Ethylene glycol bis(4-hydroxyphenyl) ether
Bis(4-hydroxyphenyl) ether
Bis(4-hydroxyphenyl) sulfide
Bis(4-hydroxyphenyl) sulfoxide
Bis(4-hydroxyphenyl) sulfone
Bis(3,5-dimethyl-4-hydroxyphenyl) sulfone
9,9-Bis(4-hydroxyphenyl)fluorene
2,7-Dihydroxypyrene
6,6'-Dihydroxy-3,3,3',3'-tetramethylspiro (bis)indane ("spirobiindane bisphenol")
3,3-Bis(4-hydroxyphenyl)phthalide
2,6-Dihydroxydibenzo-p-dioxin
2,6-Dihydroxythianthrene
2,7-Dihydroxyphenoxathiin
2,7-Dihydroxy-9,10-dimethylphenazine
3,6-Dihydroxydibenzofuran
3,6-Dihydroxydibenzothiophene
2,7-Dihydroxycarbazole.

Bisphenol A (in which Y is isopropylidene and $A^1$ and $A^2$ are each p-phenylene) is often especially preferred for reasons of availability and particular suitability for the purposes of the invention.

Also useful are bisphenols containing ester linkages. These may be prepared, for example, by reacting two moles of bisphenol A with one mole of isophthaloyl or terephthaloyl chloride.

As previously explained, the molecular weight control agent used according to the invention is a phenol or similar monohydroxyaromatic compound. Compounds of this type useful to regulate the molecular weight of polycarbonate are known in the art; examples are phenol, p-t-butylphenol, p-cumylphenol, octylphenol and nonylphenol. Phenol is often preferred by reason of its low cost, availability and effectiveness.

Introduction of the phenol into the reaction mixture may be effected neat or in aqueous or organic solution. If desired, it may be introduced as a salt, most often an alkali metal salt.

Also employed in step A of the method of this invention are water, an inert organic liquid and an alkali or alkaline earth metal base. Said organic liquid should also be substantially insoluble in water. Illustrative liquids are aliphatic hydrocarbons such as hexane and n-heptane; chlorinated aliphatic hydrocarbons such as methylene chloride, chloroform, carbon tetrachloride, dichloroethane, trichloroethane, tetrachloroethane, dichloropropane and 1,2-dichloroethylene; aromatic hydrocarbons such as benzene, toluene and xylene; substituted aromatic hydrocarbons such as chlorobenzene, o-dichlorobenzene, the chlorotoluenes, nitrobenzene and acetophenone; and carbon disulfide. The chlorinated aliphatic hydrocarbons, especially methylene chloride, are preferred.

The alkali or alkaline earth metal base is most often a hydroxide such as sodium hydroxide, potassium hydroxide or calcium hydroxide. In relatively small scale reactions, especially those conducted batchwise, calcium hydroxide may be preferred since its limited solubility aids in stabilizing the pH in the range of about 11.8–12.3. Carbonates and bicarbonates may also be employed and frequently provide a degree of buffering which may be advantageous.

Sodium and potassium hydroxides, and especially sodium hydroxide, are often preferred on a larger scale because of their relative availability and low cost. Their use requires a relatively high flow rate in the vicinity of pH monitoring means such as pH electrodes, to prevent fouling. Frequent reference to sodium hydroxide will be made hereinafter, but the invention is obviously not limited thereto.

Formation of the partially capped bischloroformate composition in step A may be effected under any interfacial reaction conditions suitable for the reaction of chloroformates with hydroxyaromatic compounds. Thus, contact of the phenol with the bischloroformate composition may, for example, involve temperatures in the range of about 0°-50° C. and pH values of the aqueous phase in the range of about 2-11.5. Time periods may be from a few seconds to 20 minutes or more; longer time periods are not harmful, but times greater than about 30 minutes ordinarily provide no discernible advantage. Suitable conditions are known to those skilled in the art and/or may be determined by simple experimentation. At low pH values, it may frequently be necessary to conduct the reaction over a relatively long time period and/or at relatively high temperatures, exemplified by the reflux temperature of methylene chloride (about 40° C.). When the pH is high, on the other hand, lower temperatures and/or shorter reaction times may be advisable to avoid hydrolysis of chloroformate groups.

The proportion of phenol with respect to bischloroformate will depend on the desired molecular weight and/or intrinsic viscosity of the linear polycarbonate product. In general, lower amounts of phenol are required according to the present invention than in interfacial polymerizations or in bischloroformate polymerization wherein the phenol is first introduced during the polymerization reaction. Phenol amounts of about 0.5-7.0 mole percent, based on structural units in the bischloroformate composition, are typical.

The product of step A is a partially (generally about 2-5 mole percent) capped bischloroformate composition wherein by far the greater proportion of the capped molecules are monocapped and therefore still reactive at one end. Dicapped molecules would, of course, be inert to further reaction and would have a low molecular weight compared to that of the linear polycarbonate desired as the ultimate product of the method of this invention. Thus, such molecules if present in substantial proportions might skew molecular weight determinations and also cause molding difficulties such as those previously described. It has been discovered, however, that the proportion of dicapped species in the partially capped bischloroformate composition is not high enough to give rise to these problems.

In step B, the partially capped bischloroformate composition is contacted with an interfacial polycarbonate formation catalyst and further aqueous alkali metal or alkaline earth metal base. Such contact most often takes place in the presence of the organic liquid from step A, and is therefore heterogeneous. Also present may be at least one bisphenol of formula II or salt thereof.

As interfacial polycarbonate formation catalysts, there may be used, for example, the tertiary amines disclosed in U.S. Pat. Nos. 4,217,438 and 4,368,315, the disclosures of which are incorporated by reference herein. They include aliphatic amines such as triethylamine, tri-n-propylamine, diethyl-n-propylamine and tri-n-butylamine and highly nucleophilic heterocyclic amines such as 4-dimethylaminopyridine (which, for the purposes of this invention, contains only one active amine group). The preferred amines are those which dissolve preferentially in the organic phase of the reaction system; that is, for which the organic-aqueous partition coefficient is greater than 1. This is true because intimate contact between the amine and bischloroformate composition is essential for polycarbonate formation. For the most part, such amines contain at least about 6 and preferably about 6-14 carbon atoms.

The most useful amines are trialkylamines containing no branching on the carbon atoms in the 1- and 2-positions. Especially preferred are tri-n-alkylamines in which the alkyl groups contain up to about 4 carbon atoms. Triethylamine is most preferred by reason of its particular availability, low cost, and effectiveness. Also useful are quaternary ammonium and phosphonium salts and amidines of the type known in the art to be effective in the reaction of phosgene with bisphenols.

In general, the polycarbonate formation reaction may be conducted at a temperature in the range of about 0°-100° C. and preferably about 20°-50° C.; at a pH in excess of about 10, preferably in the range of about 11-14; and using an amount of catalyst within the range of about 0.025-3.0 mole percent based on structural units in the bischloroformate composition.

Either batch or continuous conditions may be used for the method of this invention, or one step may be conducted batchwise and the other continuously. If step A is conducted batchwise, all residual phosgene should first be destroyed by conventional methods. Continuous methods employable in step B include those described in the aforementioned patents and copending application, the disclosures of which are incorporated by reference herein.

The reasons for the decrease in phenol required for molecular weight control according to the present invention are not fully understood. A possible factor is relatively slow migration of phenol from aqueous to organic phase during polycarbonate formation by prior art methods, as compared to the relatively rapid polycarbonate-forming reaction. In the present invention, on the other hand, no competing polymerization takes place during step A and capping can go essentially to completion prior to initiation of polymerization during step B. The invention is, of course, in no way dependent on theory.

The invention is illustrated by the following examples. Polycarbonate molecular weights are weight average molecular weights determined by gel permeation chromatography. Intrinsic viscosities were measured in chloroform at 25° C.

EXAMPLE 1

A 500-ml. Morton flask fitted with a stirrer, reflux condenser and thermometer was charged with 150 ml. of deionized water, 1 gram of sodium bicarbonate, 225 mg. (2.4 mmol.) of phenol and 100 ml. of a bisphenol A bischloroformate composition containing 100 mmol. of total bisphenol A structural units and corresponding roughly in molecular weight to the dimer. The mixture was stirred for 20 minutes as 50% aqueous sodium hydroxide solution was added to maintain the pH at 8.5. At the end of that time, analysis of the organic phase by gel permeation chromatography showed no remaining phenol.

Calcium hydroxide, 15 grams, was added to the mixture and a solution of 101 mg. (1 mmol.) of triethylamine in 10 ml. of methylene chloride was introduced at a constant rate over 5 minutes, during which time the reaction mixture reached the reflux temperature. Stirring was continued for an additional 25 minutes, after which the organic phase was separated, washed repeatedly with aqueous acid and water and evaporated to yield the linear polycarbonate.

Duplicate products made by this procedure were compared in molecular weight to control products prepared by a similar process in which the phenol and triethylamine were added concurrently to the mixture of bischloroformate solution and water. The products prepared by the method of the invention had molecular weights of 33,300 and 29,300, as compared with 41,800 and 50,400 for the controls. Thus, the method of this invention utilizes phenol substantially more efficiently than the controls, to produce a polycarbonate of lower molecular weight

EXAMPLE 2

A 1-liter Morton flask fitted with a stirrer, a reflux condenser, a pH electrode and tubes for addition of phosgene (dip tube) and sodium hydroxide solution was charged with 57 grams (250 mmol.) of bisphenol A, 250 ml. of methylene chloride and 250 ml. of water. Phosgene was passed through the mixture at 25° C., with stirring, for 2 hours at 610 mg. per minute (total 739.4 mmol.), as 25% aqueous sodium hydroxide solution was added to maintain a pH of 8.5. The mixture was stirred at this pH for an additional 20 minutes, after which there were added 125 ml. of water and 340 mg. (2.3 mmol.) of p-t-butylphenol. Stirring was continued for 5 minutes, after which additional base was introduced to increase the pH to 12 and a solution of 250 mg. (2.48 mmol.) of triethylamine in 5 ml. of methylene chloride was added over 5 minutes. The mixture was stirred for an additional 30 minutes, after which the polycarbonate product was isolated as in Example 1. It had an intrinsic viscosity of 0.62 dl./g.

A similar polycarbonate was prepared by passing phosgene at 950 mg. per minute for 30 minutes (total 287.9 mmol.) into a mixture of bisphenol A, methylene chloride and triethylamine in the above amounts, 125 ml. of water and 530 mg. (3.53 mmol.) of p-t-butylphenol. The pH was maintained at 10.5 by the addition of 25% aqueous sodium hydroxide solution. The resulting polycarbonate also had an intrinsic viscosity of 0.62 dl./g. Thus, substantially less p-t-butylphenol was required according to the method of this invention than in a conventional interfacial polymerization procedure.

What is claimed is:

1. A method for preparing a linear aromatic polycarbonate of controlled molecular weight which comprises the steps of:
   (A) reacting an aromatic bischloroformate composition with a monohydroxyaromatic compound or salt thereof in an essentially phosgene-free reaction system also comprising water, a substantially inert, substantially water-insoluble organic liquid and an alkali or alkaline earth metal base, to produce a partially capped bischloroformate composition; and
   (B) contacting said partially capped bischloroformate composition with an interfacial polycarbonate formation catalyst and an aqueous alkali metal or alkaline earth metal base to form said linear aromatic polycarbonate.

2. A method according to claim 1 wherein the aromatic bischloroformate composition comprises compounds having the formula

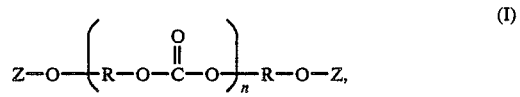

wherein R is a divalent aromatic radical; each Z is independently H or

at least one Z being

and n is from 0 to about 6.

3. A method according to claim 2 wherein step A is effected at a temperature in the range of about 0°-50° C. and a pH value of the aqueous phase in the range of about 2-11.5.

4. A method according to claim 3 wherein the organic liquid is methylene chloride.

5. A method according to claim 4 wherein the amount of monohydroxyaromatic compound or salt thereof is about 0.5-7.0 mole percent, based on structural units in the bischloroformate composition.

6. A method according to claim 5 wherein the monohydroxyaromatic compound is phenol, p-t-butylphenol, p-cumylphenol, octylphenol, nonylphenol or a salt thereof.

7. A method according to claim 5 wherein R has the formula $$-A^1-Y-A^2- \qquad (III)$$

wherein each of $A^1$ and $A^2$ is a monocyclic divalent aromatic radical and Y is a bridging radical in which one or two atoms separate $A^1$ from $A^2$.

8. A method according to claim 7 wherein the base is at least one of sodium hydroxide and calcium hydroxide and step B is effected at a temperature in the range of about 20°-50 20 C.

9. A method according to claim 8 wherein $A^1$ and $A^2$ are each p-phenylene and Y is isopropylidene.

10. A method according to claim 9 wherein the monohydroxyaromatic compound is phenol.

11. A method according to claim 9 wherein the monohydroxyaromatic compound is p-t-butylphenol.

12. A method according to claim 9 wherein the monohydroxyaromatic compound is p-cumylphenol.

13. A method according to claim 8 wherein step B is conducted at a pH in the range of about 10-14 and the amount of catalyst employed therein is in the range of about 0.025-3.0 mole percent based on structural units in the bischloroformate composition.

14. A method according to claim 13 wherein the interfacial polycarbonate formation catalyst is a tertiary amine, quaternary ammonium or phosphonium salt or amidine.

15. A method according to claim 14 wherein the interfacial polycarbonate formation catalyst is a trialkylamine.

16. A method according to claim 15 wherein the interfacial polycarbonate formation catalyst is triethylamine.

17. A method according to claim 16 wherein $A^1$ and $A^2$ are each p-phenylene and Y is isopropylidene.

18. A method according to claim 17 wherein the monohydroxyaromatic compound is phenol.

19. A method according to claim 17 wherein the monohydroxyaromatic compound is p-t-butylphenol.

20. A method according to claim 17 wherein the monohydroxyaromatic compound is p-cumylphenol.

* * * * *